Nov. 24, 1959
A. N. WENNERBERG
2,914,453
PURIFICATION AND RECOVERY OF NORMALLY SOLID POLYMERS
Filed Nov. 19, 1956
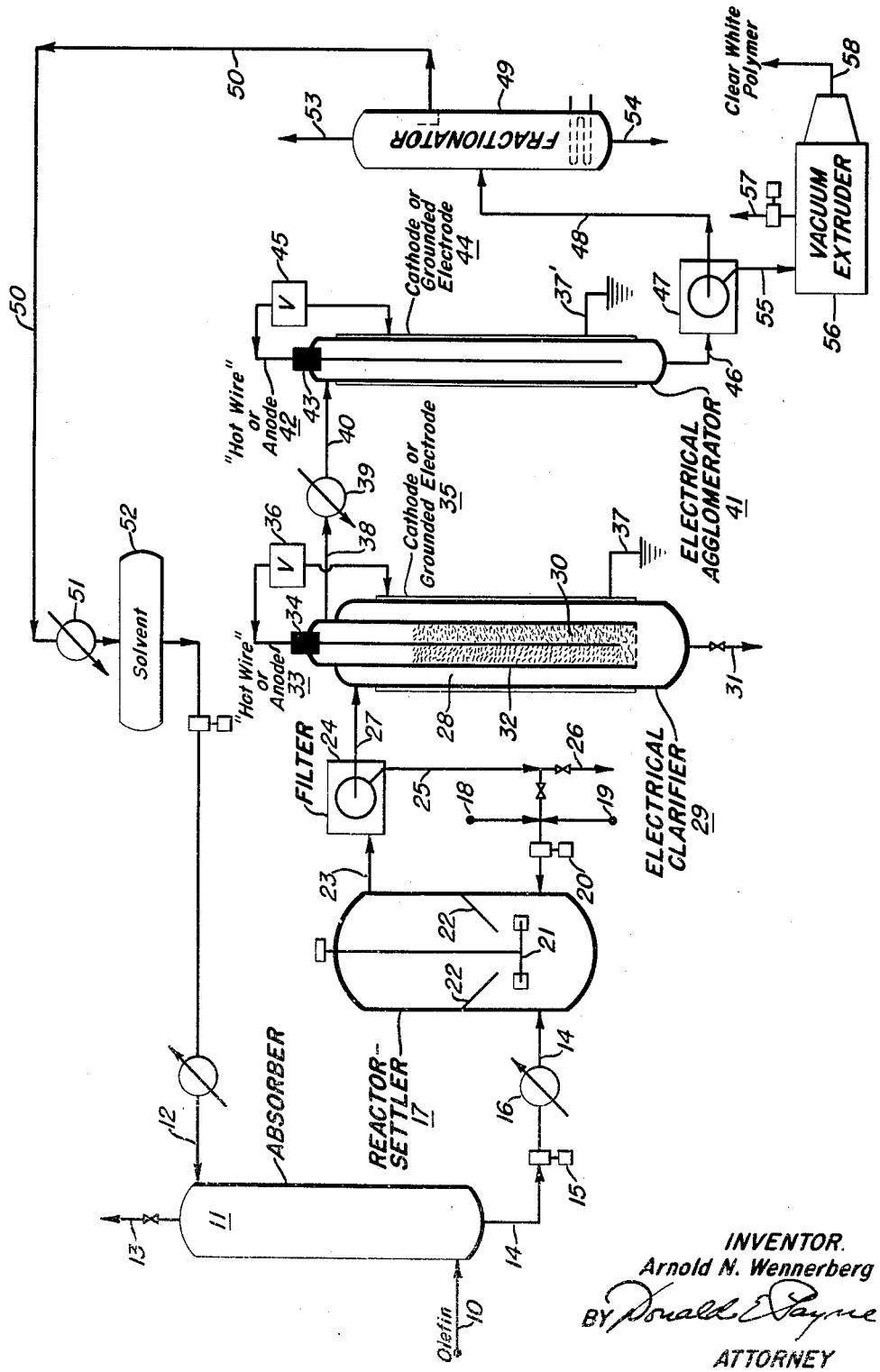
INVENTOR.
Arnold N. Wennerberg
BY Donald E. Payne
ATTORNEY

United States Patent Office 2,914,453
Patented Nov. 24, 1959

2,914,453

PURIFICATION AND RECOVERY OF NORMALLY SOLID POLYMERS

Arnold N. Wennerberg, Chicago, Ill., assignor to Standard Oil Company, Chicago, Ill., a corporation of Indiana Application November 19, 1956, Serial No. 623,226

5 Claims. (Cl. 204—186)

This invention relates to improvements in purification and recovery of normally solid polymers and it pertains more particularly to improved techniques for treating solutions of solid polymers in dielectric solvents by dielectrophoresis.

The normally solid polymers are preferably those obtained from the polymerization of olefins, particularly normally gaseous straight chain olefins such as ethylene and/or propylene, by means of a catalyst comprising an inorganic solid such as a partially reduced oxide or other compound of a metal of groups IV, V, VI and VIII, preferably distended on a support such as alumina, zirconia or titania, with or without the presence of suitable promoters such as a metal, alloy, hydride and/or hydrocarbon derivative of a metal or metaloid of groups I, II and III, or other materials known by those skilled in the art to have a polymerizing and/or promoting effect (note U.S. 2,692,257, 2,691,647, 2,692,261, etc. and Belgian Patents 530,617, 533,362, 534,792 and 534,888). Such polymers are either formed in the presence of a solvent or are subsequently dissolved in a solvent in order to enable catalyst and/or promoter to be separated therefrom. The solvent should be an organic liquid which is highly dielectric and it may be a saturated cyclic hydrocarbon such as a cyclohexane, an alkyl cyclopentane, etc., a paraffinic hydrocarbon such as normal heptane, isooctane, normal decane, etc., an aromatic hydrocarbon such as benzene, toluene, xylene or other homologue thereof, or a substituted hydrocarbon of these classes, the paraffinic hydrocarbon solvent usually being preferred. The object of this invention is to provide an improved technique whereby inorganic solids and color bodies may be substantially completely removed from a polymer solution of the class described and whereby recovery of substantially pure polymer from said solution may be accomplished more effectively than has heretofore been possible. Another object is to provide improved apparatus for effecting such polymer purification and recovery. Other objects will be apparent as the description of the invention proceeds.

Regardless of whether one polymerizes ethylene and/or propylene to form high density solid polymers by the so-called Standard Oil Company (Indiana) technique, the Phillips technique or the Zeigler technique, he is confronted with the problem of separating solids and color bodies from polymer solution and then with the problem of removing solvent from polymer. I have discovered that both of these separation steps can be enormously improved by dielectrophoresis or, in other words, by effecting the separations in an inhomogeneous electric field wherein the ratio of electrode areas is in the range of about 10:1 to 100:1 and wherein the intensity of the inhomogeneous field (which may be either direct current or alternating current) is in the range of about 2 to 50, preferably 5 to 30, e.g. about 10 kilovolts per centimeter of distance between electrodes. The invention employs certain phenomena described by Herbert A. Pohl in Journal of Applied Physics, vol. 22, No. 7 (July 1951), pages 869–871.

The contaminant-containing polymer solution is preferably first subjected to an electrical clarification step while the solution is at a sufficiently high temperature to avoid precipitation of polymer itself. I have found when such a hot polymer solution, preferably after the coarser solids have been removed by cyclone separation, settling and/or filtration steps, is passed through an inhomogeneous electrical field between electrodes having a ratio of surface areas greater than 10 with a field strength in the range of about 2 to 50 kilovolts per centimeter of distance between electrodes, most of the solids and some of the color bodies are removed from said solution mostly at the anode or positive small electrode although some of the solids are drawn to the cathode since some electrophoresis takes place even though the major phenomenon is dielectrophoresis. The hot solution usually contains color bodies which can be effectively removed only by contact with adsorptive material such as Attapulgus clay, silica gel, fuller's earth, bauxite, alumina or equivalent adsorptive solids. I have discovered that when the percolation through adsorptive solids occurs in the inhomogeneous electrical field, the effectiveness of the adsorption step is remarkably enhanced, a given amount of clay removing about 4 to 10 times as much color as would be removed by an equivalent amount of clay in the absence of the inhomogeneous electrical field. The resulting clarified solution is substantially crystal clear.

The high temperature electrical clarification step is preferably effected by first passing the hot solution downwardly as an annular stream in the inhomogeneous electrical field and then passing the solution upwardly through a bed of adsorbent solids which surrounds the anode and is thus in the highest density portion of the inhomogeneous electrical field. The electrical clarification step should not be confused with electrical precipitation which requires direct current; in my process the current may be either direct or alternating and since the solvent has high dielectric properties, there is very little flow of electrical current, usually less than 20 microamperes.

After the hot polymer solution has been electrically clarified at a sufficiently high temperature to maintain the desired polymer in solution, the solution is cooled or otherwise altered in order to throw desired polymer out of solution. The separation of polymers such as solid polyethylene and polypropylene from solvent presents many problems and difficulties because the polymer may separate out of solution in extremely finely divided physical form or in gelatinous form or in other forms which are extremely difficult to filter. I have discovered that if such a difficultly filterable suspension of polymer in solvent is passed through an inhomogeneous electrical field while a voltage difference of the order of 5 to 10 kilovolts per centimeter is built up between two electrodes having a ratio of surface areas greater than 10:1 and preferably at least 30:1, an exposure time of the order of 5 to 15 seconds is adequate to agglomerate the polymer into large dense particles which can be easily filtered or centrifuged. At peak potentials very much above 10 kilovolts with a contact time in excess of about 15 seconds, the agglomerated particle size and density tend to increase but the subsequent release of polymer from electrode at zero voltage is less complete; in other words, the use of unduly high voltages may result in agglomerated polymer sticking to one or both of the electrodes which, of course, is undesirable since it further complicates the separation problem.

The invention will be more clearly understood from the following detailed description of a specific example thereof read in conjunction with the accompanying drawing which forms a part of this specification and which is a schematic flow diagram of my improved solid polymer purification and recovery system.

Referring to the drawing, a crude ethylene stream is introduced through line 10 to the base of absorber 11 wherein it is counter-currently contacted with cool normal decane which is introduced at the upper part of the absorber through line 12. The absorber may be operated at a pressure of about 200 to 2,000 p.s.i.g at a temperature of the order of about 0 to 50° C. Unabsorbed gases are vented from the top of the absorber through line 13 and the rich ethylene solution is withdrawn from the bottom of the absorber through line 14 and pumped by pump 15 through heater 16 to reactor 17 which may operate at a pressure of the order of 300 to 5,000, e.g. about 1,000 p.s.i.g. at a temperature in the range of about 30 to 300° C., e.g. about 200° C. depending, of course, on the particular catalyst and/or catalyst promoter which is employed. The specific catalyst promoter and reaction conditions may be as set forth in U.S. 2,691,647 or in any other known process for making high density solid polymers of propylene and/or ethylene. The catalyst in this example is introduced from source 18 and the promoter from source 19, both being introduced by pump 20 along with the olefin solution which is introduced through line 14. The amount of olefin in the solution may be in the range of about 1 to 10 percent or more and it is usually of the order of about 2 to 6 percent. An impeller type mixer 21 may be mounted in the lower part of reactor 17 for effecting the required intimacy of admixture. A downwardly inclined cone-shaped baffle 22 separates the mixing zone from an upper settling zone in the reactor, the space above the baffle being relatively quiescent so that catalyst solids may settle out and flow back into the mixing zone. Polymer solution is withdrawn from reactor 17 through line 23 at substantially reaction pressure and at a temperature of about 200° C. to separator 24 which may be a cyclone separator, filter or a centrifuge and which in this example is a filter. Filtered solids are returned by line 25 for return to the reactor in slurry form by pump 20 or alternatively they may be withdrawn from the system through line 26.

The hot filtered solution which leaves the filter through line 27 still contains about .2 percent of catalyst fines (including color bodies), about 2.9 percent of polyethylene, 3.9 percent of unreacted ethylene and 93 percent solvent. Although unreacted ethylene may be flashed from this hot solution and returned to the absorber and the remaining solution may be depressured, its temperature should be high enough to keep the solid polymer in solution, i.e. about 150–200° C. This hot solution is passed downwardly through open annular space 28 between outer cylindrical vessel walls 29 and inner cylindrical vessel walls 30, the outer vessel being provided with a valved draw-off line 31 at its base and being sealed at its top to the outer upper part of inner vessel 30 which in turn contains a bed of adsorptive solids such as Attapulgus clay, silica gel, fuller's earth, or the like, 32 packed around central electrode 33 which is insulated from the respective vessels by insulator 34. In this example the walls of the vessels were of glass, the inner electrode was a 16 gauge Nichrome wire 10 inches long and an outer electrode 35 was formed around outer vessel 29 by simply wrapping metal foil around said vessel. The distance between the central "hot wire" electrode (anode with D.C.) 33 and the outer grounded electrode (cathode with D.C.) was in this case approximately 3 centimeters. An electrical current source 36 was connected to anode 33 on one side and to cathode 35 at its other side (the cathode was grounded at 37) so as to maintain a voltage drop across the electrodes of about 30 kilovolts (i.e. about 10 kilovolts per centimeter). While direct current was employed in this particular example, alternating current may be used equally well. The actual current is small, about 1 to 20 microamperes.

During normal operation of the electrical clarifier which has been hereinabove described, most of the catalyst solids separate out of the solution as it flows downwardly in annular space 28 and concentrated catalyst slurry may be removed from time to time by opening the valve in line 31. As the solution passes upwardly through the solid adsorbent material in the inhomogeneous field, all color bodies are eliminated from the solution so that a substantially crystal clear polymer solution leaves the upper part of the inner vessel through line 38. The flow may be upward in the outer path and downward in the central path, and a filter or other separation device may be employed in place of the illustrated trap. Electrical clarifiers are preferably mounted in parallel so that the adsorbent may be replaced and vessel walls may be cleaned in one system while the other system is on stream. Some degree of polymer clarification may be obtained by percolating the solution through an adsorbent solid system in the absence of any electrical field, i.e. either before or after catalyst solids have been removed, for example, by passage of the solution through an inhomogeneous electrical field in a separate zone; the final polymer thus obtained is usually of inferior color and is inferior in electrical properties to the clarified polymer which is obtained by subjecting the solution simultaneously to percolation through solid adsorbent and to the presence of an inhomogeneous electrical field.

After the electrical clarification step the solution is cooled from a high temperature in the range of about 150–250° C., e.g. 180° C., to a lower temperature in the range of about 50 to 240° C., e.g. about 80° C., as it passes from line 38 through cooler 39 to line 40 and thence to agglomerator 41. Agglomerator 41 is simply a cylindrical conduit provided with a central "hot wire" electrode or anode 42 which is insulated from the conduit by insulation 43 and a cylindrical outer electrode 44 which has an area at least 10 times greater than that of electrode 42, a current source 45 being provided to apply a voltage of about 20 kilovolts across the electrodes. In the agglomerator the polymer is no longer dissolved in solvent but it is suspended therein in fine gelatinous and/or relatively unfilterable form. By building up to peak voltage of about 10 kilovolts per centimeter in a period of about 5 to 15 seconds more or less, then returning to zero potential, the polymer is agglomerated into relatively large dense particles which do not adhere to the electrode surfaces. If unduly high voltages are applied across the electrodes, polymer may loosely adhere to one or both electrodes so that cleaning thereof may become necessary. However, by employing a maximum voltage of the order of 2 to 10 kilvolts per centimeter distance between electrodes and by alternately applying peak voltage and zero voltage across the electrodes at time intervals of about 5 to 50 seconds, polymer is converted into a form which is readily separable from solvent by filtration or other physical separation means. Such an agglomerated suspension of polymer is withdrawn from the base of the agglomerator through line 46 to filter 47 from which solvent is introduced by line 48 to recovery system diagrammatically represented by fractionator 49 from which solvent is returned by line 50 through condenser 51 to storage vessel 52. Any lighter material may be removed from the system through line 53 and any heavier material through line 54.

The filtered polymer agglomerates are withdrawn through line 55 to a vacuum extruder diagrammatically represented by element 56, the polymers being forced in a thin film into a zone of reduced pressure (under relatively high vacuum) for the recovery of additional solvent which may be recovered by line 57. The solvent-free polymer, which is extruded as a ribbon 58 from the vacuum extruder, is remarkably clear and white, is substantially free from solids and ash-forming material as well as color bodies and has excellent electrical properties as well as excellent ability to be molded and formed into sheets, plates, films, etc.

The process description and flowsheet have been highly simplified since no novelty is claimed in the catalysts, promoters or conditions under which the polymer solution is originally obtained. In fact, such a solution may be obtained by dissolving an impure polymer (obtained from any source whatsoever) in an organic dielectric solvent such as the saturated or aromatic hydrocarbons hereinabove described. Solutions of other solids in suitable dielectric solvents may similarly be clarified and freed from color bodies and other impurities while the solution is at a sufficiently elevated temperature to avoid separation of the desired solid; the solution may then be cooled to give a suspension of desired solid in solvent, the suspension may be subjected to an inhomogeneous electrical field as hereinabove described for effecting agglomeration, solvent may be removed from agglomerated solids by settling, centrifuging or filtration and separated solids may be passed through a vacuum extruder for eliminating substantially all solvent from a practically pure strip or ribbon.

In some cases polymers of required purity may be obtained without employing an electrical field in the clarification step, i.e. simply by precipitating the highest molecular weight portion of the polymer so that it occludes any catalyst or promoter fines which may be present and then separating the resulting solid from the remaining solution. Percolation of the hot solution through beds of silica gel, Attapulgus clay or other known color adsorbents may be adequate for removing a large part of the color. It appears that the color may be a metallo-organic compound since such a striking improvement in decolorization can be effected by percolating the hot solution through adsorbent solids in the presence of the inhomogeneous electrical field. Applicant should not be bound, however, to this theory of operation and it appears that the color is caused, at least in part, by oxidation of some component.

The apparatus described herein is being claimed in my continuation-in-part application Serial No. 666,968, filed June 20, 1957.

While a particular embodiment of the invention has been described in considerable detail, it should be understood that alternative apparatus arrangements and operating techniques and conditions will be apparent from the foregoing description to those skilled in the art.

I claim:

1. The method of effecting clarification of a solution of a high-molecular-weight, solid polyolefin in a dielectric solvent which solution contains solid catalyst particles and color bodies, which method comprises flowing the solution through an inhomogeneous electrical field between electrodes having a ratio of surface areas greater than 10 and with a field strength in the range of 2 to 50 kilovolts per centimeter of distance between electrodes whereby solids are removed from said solution by dielectrophoresis and percolating said solution through a mass of solid adsorptive material selected from the class consisting of clay, silica gel, fuller's earth, bauxite and alumina for removing color bodies from said solution, said percolation being likewise effected in an inhomogeneous electrical field between electrodes having a ratio of surface areas greater than 10 and with a field strength in the range of 2 to 50 kilovolts per centimeter of distance between electrodes.

2. The method of claim 1 wherein the dielectrophoresis is effected in a downflowing outer annular zone, the percolation through adsorptive material is upflow in an inner cylindrical zone and both the inner and outer zones are encompassed in an inhomogeneous electrical field.

3. The method of making an olefin polymer which method comprises forming a solution of said olefin in a dielectric solvent, polymerizing said olefin in the presence of said solvent by use of a solid inorganic catalyst which is a compound of an element of a metal of groups IV, V, VI and VIII and a promoter selected from the class consisting of a metal, alloy, hydride and hydrocarbon derivatives of a metal of groups 1 to 3, inclusive, of the periodic table, mechanically separating readily separable solids from polymerization effluent solution, electrically separating impurities in said solution not removed by mechanical separation, the step of electrically separating impurities comprising percolation of the solution through a mass of solid adsorptive material in the presence of an inhomogeneous electrical field between electrodes having a ratio of surface areas greater than 10 and with a field strength in the range of 2 to 50 kilovolts per centimeter of distance between electrodes, said solid adsorptive material being selected from the class consisting of clay, silica gel, fuller's earth, bauxite and alumina.

4. The method of claim 3 which includes the step of precipitating polymer in difficultly separable form and which includes the step of electrically agglomerating the precipitated polymer.

5. The method of obtaining clean white polymer from a solution of a normally solid polyolefin in a dielectric solvent which solution contains solid catalyst particles and color bodies, which method comprises separating solids from said solution while it is sufficiently hot to keep polyolefin dissolved therein, separating color bodies from the hot solution by contacting it with an adsorbent solid in an inhomogeneous electrical field between electrodes having a ratio of surface areas greater than 10 with a field strength in the range of 2 to 50 kilovolts per centimeter of distance between electrodes, said adsorbent solid being selected from the class consisting of clay, silica gel, fuller's earth, bauxite and alumina, precipitating polymer in difficultly filterable form from the clarified solution and agglomerating precipitated polymer by subjecting it to an inhomogeneous electrical field between electrodes having a ratio of surface areas greater than 10 with a field strength in the range of 2 to 50 kilovolts per centimeter of distance between electrodes and thereafter separating solvent from agglomerated polymer.

References Cited in the file of this patent

UNITED STATES PATENTS

| | | |
|---|---|---|
| 1,796,750 | Eddy | Mar. 17, 1931 |
| 2,261,108 | Dillon et al. | Nov. 4, 1941 |
| 2,534,907 | Ham et al. | Dec. 19, 1950 |
| 2,573,967 | Hamlin | Nov. 6, 1951 |
| 2,614,976 | Patnode et al. | Oct. 21, 1952 |
| 2,663,687 | Bailey | Dec. 22, 1953 |
| 2,681,311 | De Wit | June 15, 1954 |
| 2,691,647 | Field et al. | Oct. 12, 1954 |